March 4, 1924.  F. PALOMBO  1,486,106

TIRE

Filed March 29, 1923

INVENTOR
FAUSTINO PALOMBO

BY Munn & Co
HIS ATTORNEYS

WITNESSES:
W. Himebaugh
S.W. Foster

Patented Mar. 4, 1924.

1,486,106

UNITED STATES PATENT OFFICE.

FAUSTINO PALOMBO, OF BEDFORD, OHIO.

TIRE.

Original application filed October 27, 1922, Serial No. 597,309. Divided and this application filed March 29, 1923. Serial No. 628,588.

*To all whom it may concern:*

Be it known that I, FAUSTINO PALOMBO, a citizen of the United States, and a resident of Bedford, in the county of Cuyahoga and State of Ohio, have invented a new and Improved Tire, of which the following is a full, clear, and exact description.

This invention relates to improvements in tires, an object of the invention being to provide a solid core within the tire shoe, the core being in sections and readily removable as occasion may require.

A further object is to provide a tire core, comprising a circular series of solid sections of relatively light material, the meeting ends of certain of the sections, being on a line parallel to the diameter of the wheel, whereby these sections can be moved radially of the wheel either to remove or to replace them, to enable the assemblage or removal of the sections with relation to the tire shoe.

This is a division of application filed by me October 27, 1922, on an improved spring wheel, said application being given Serial No. 597309.

With these and other objects in view, the invention consists in certain novel features of construction and combinations, and arrangement of parts, as will be more fully hereinafter described and pointed out in the claims.

In the accompanying drawings—

Figure 1:
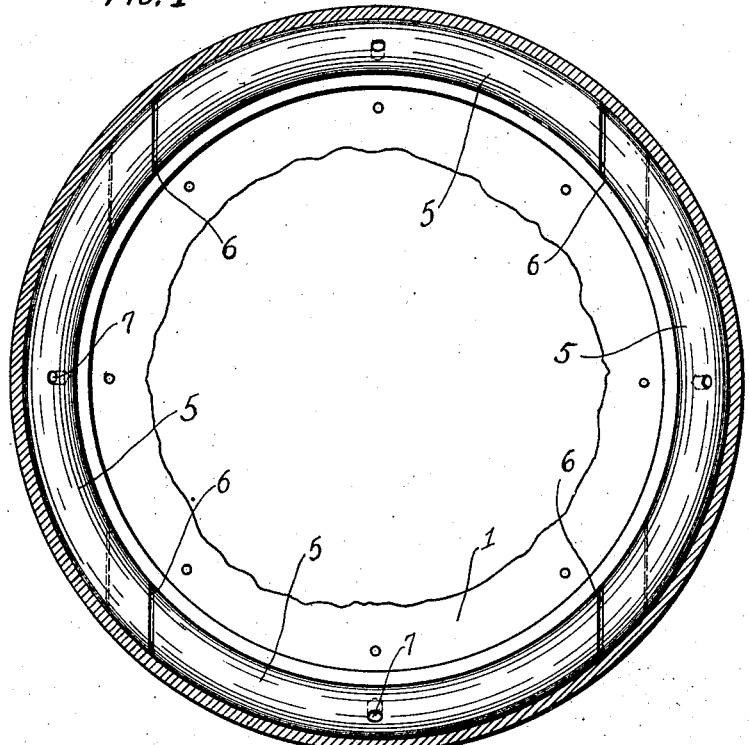
Figure 1 is a view partly in longitudinal section and partly in elevation, illustrating my improved tire.
Figure 2:
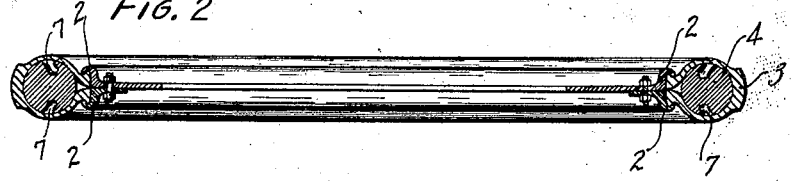
Figure 2 is a view in transverse section taken through the center of Figure 1.
Figure 3:
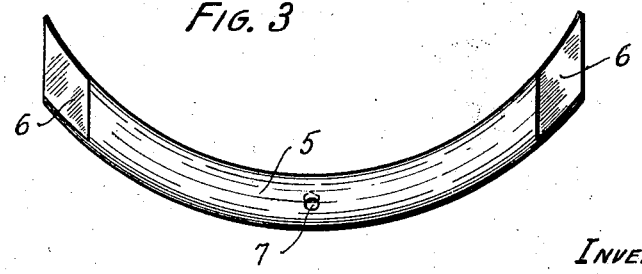
Figure 3 is a view in elevation of one of the core sections.

1 represents a wheel, which may be of any desired construction, and provided with a rim 2 which may be of two sections, as shown clearly in Figure 2; or the rim may be of any ordinary construction but preferably of a clincher type, either demountable or not, as may be preferred, as it is to be understood that my invention is not limited to any particular construction of wheel or rim.

3 represents an ordinary tire shoe, which is supported by the rim 2, and in this shoe 3 I provide my improved core 4 to take the place of a pneumatic tube and to render the tire in effect a solid tire, yet having a core which is relatively light, which is sectional, and which can be removed and replaced as desired.

The core 4 comprises a plurality of sections 5, and while I have shown but four of these core sections, it is obvious that any desired number may be employed, it being understood that the core sections when located in the shoe, will entirely fill the same.

These core sections 5 may be of wood or any other suitable strong light material, and are provided with tongue and groove joints 6 to hold them against lateral independent movement. Certain of these sections 5 and at least two which are diametrically opposite to each other, have their lines of juncture with adjacent core sections parallel with the diameter of the wheel, so that these sections may be drawn in a radial line either to force them into the shoe, or to remove them from the shoe.

To facilitate the movement of the core sections, I provide recesses 7 in opposite sides thereof, and into these recesses a suitable clamping tool can be inserted to grip the core section and move it relative to the shoe.

By providing a core of this character I can utilize any ordinary shoe and change the same into a solid tire which is relatively light, and which will withstand all of the strains and stresses to which it is necessarily put.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A tire core, comprising a circular series of separable sections adapted to fit within, a shoe, certain of said sections having their ends parallel to the diameter of the tire.

2. A tire, comprising an outer shoe and an inner core, said core of solid material and comprising a circular series of sections having tongue and groove joints, the tongue and groove joints of certain of the sections having their ends parallel to the diameter of the tire whereby said sections may be moved radially relative to the tire for insertion and removal.

3. A tire, comprising an outer shoe and an inner core, said core of solid material and comprising a circular series of sections having tongue and groove points, the tongue and groove points of certain of the sections having their ends parallel to the diameter of the tire whereby said sections may be moved radially relative to the tire for insertion and removal, and recesses on opposite sides of certain of the core sections for the reception of a tool to manipulate them.

FAUSTINO PALOMBO.